United States Patent [19]

Huichun

[11] Patent Number: 4,765,724

[45] Date of Patent: Aug. 23, 1988

[54] GRATING-FILM RAINBOW-PRODUCING LAMINAR DEVICE

[76] Inventor: Shang Huichun, 303 Unite 2 Bldg 6, Zaolin Xili, Xuanwu District, Beijing, China

[21] Appl. No.: 845,519

[22] Filed: Mar. 28, 1986

[30] Foreign Application Priority Data

Apr. 1, 1985 [CN] China ................................ 85200328

[51] Int. Cl.[4] ............................ G02B 5/18; B44F 1/00

[52] U.S. Cl. ................................................ 350/162.18

[58] Field of Search ....................... 350/162.17, 162.18, 350/162.19, 162.20

[56] References Cited

U.S. PATENT DOCUMENTS

| | | | |
|---|---|---|---|
| 734,134 | 7/1903 | Porter | 350/162.18 |
| 4,009,939 | 3/1977 | Okano | 350/162.2 |
| 4,604,329 | 8/1986 | Reber | 350/162.18 |

OTHER PUBLICATIONS

McGraw Hill, Encyclopedia of Science and Technology, vol. 4, pp. 151–152, Jul., 1973.

*Primary Examiner*—Bruce Y. Arnold

*Attorney, Agent, or Firm*—Hill, Van Santen, Steadman & Simpson

[57] ABSTRACT

A grating-film iris-producing laminar device has one or more substrates and one or more sheets of two-dimensional grating films, wherein the sets of grooves on the grating films intersect at a selected angle, hence a large number of light-passing holes are formed. The device is constructed with the grating films fixed to the substrates and produces color patterns when it is positioned before any non-monochromatic light source. The two-dimensional grating films can be replaced by two or more sheets of one-dimensional grating films with the grooves on them to intersect at the selected angle.

27 Claims, 1 Drawing Sheet

GRATING-FILM RAINBOW-PRODUCING LAMINAR DEVICE

BACKGROUND OF THE INVENTION

The invention relates to a grating-film iris-producing laminar device.

An object of the invention is to provide a grating-film iris-producing laminar device such that a variety of color patterns can be formed when a non-monochromatic light passes the through laminar device based on the characteristics of a two-dimensional grating.

According to the invention, the grating-film iris-producing laminar device comprises one or more transparent substrates made of materials such as silica glass, organic glass or plastic as well as one or two sheets of two-dimensional grating-films each having two sets of grooves the grooves are spaced equally and are parallel with a groove density 50 to 1200 lines/mm, preferably 150 to 600 lines/mm, and the two sets intersect at a selected angle, preferably at an angle about 90°. The grating film is made of gelatine or plastic and glued on a transparent substrate or held between substrates with their edges being glued or fixed mechanically together thereafter thus to form a grating-film laminar device of the invention. The bonding agents used in the invention may be epoxy or other kinds of glues which possess good transparence and good adhesion stability.

In the invention, two or more sheets of one-dimensional grating film can alternatively be used. The same effect can be achieved when the two sheets of one-dimensional grating film are superimposed with their grooves intersecting at a selected angle, preferably at an angle about 90°. The intersections of the two sets of grooves form a large number of light-passing ports or holes, thus when the grating-film iris-producing laminar device is placed before any non-monochromatic light source, a colored light network consisting of seven monocolor wave-lengths will appear. The network will change with changes in the nature, shape, quantity and position of light sources, the density of grooves on the grating film and the intersecting angle of the two set of grooves; thereafter a variety of color parrterns are formed.

The device of the invention makes use of the two-dimensional grating characteristics. Additionally, the device of the invention has advantages such as a simple structure, low cost in manufacture, abundant in raw materials and a high profit. Those skilled in the art will better understand the invention through the accompanying drawings and text.

DESCRIPTION OF THE PREFERRED EMBODIMENTS

Figure 1:
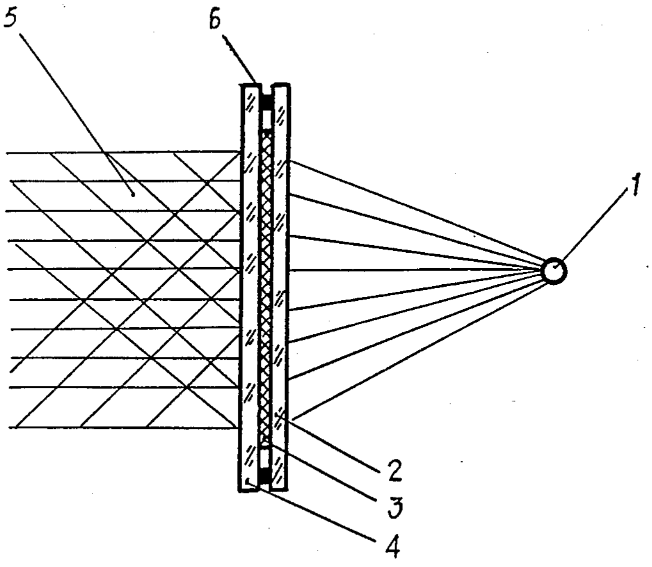
FIG. 1 is a side view of the grating-film iris-producing laminar device of the invention which shows the state when the device is position before a light source.

FIG. 1. shows a light 1 source which can be a non-monochromatic light source irrespective of its illuminating nature and its shape, transparent substrates 2 and 4 made of materials such as silica glass, organic glass or transparent plastics, a two-dimensional grating film 3 (formed by a single two-dimensional grating film sheet) or a plurality of superimposed one-dimensional grating film sheets fixed together with the substrates 2 and 4 by gluing or by mechanical attachment, a colored light network 5 formed under the irradiation of the light source 1, and a coating of glue. 6

Figure 2:
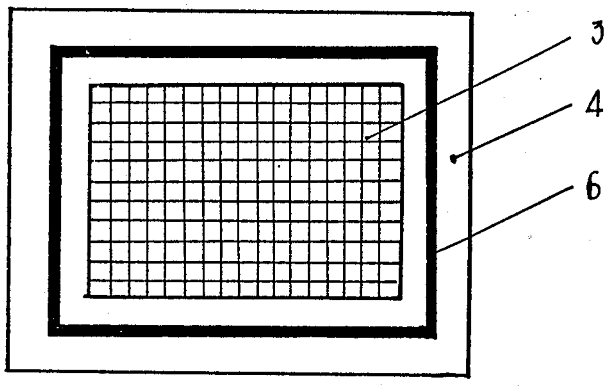
FIG. 2 is a front view of the device of the invention.

In the plan view of FIG. 2, the grating film 3, one substrate 4, and the glue bead 6 are shown.

By means of the grating-film laminar device of the invention, one can manufacture a variety of lamps, toys, house decorations and advertisment display devices Modifications and variations may be made in the aforedescribed invention without departing from the scope thereof which is defined hereafter in the claims.

I claim as my invention:

1. A grating-film rainbow-producing device for use with a non-monochromatic light source comprising:
   - a two-dimensional grating-film having a plurality of sets of equally spaced parallel grooves with the grooves of each set intersecting with respective grooves in the other sets at a selected angle to form a plurality of light-passing ports;
   - two transparent substrates with said grating-film disposed between said substrates in registry therewith; and
   - adhesive disposed at the peripheral edges of said substrates for holding said peripheral edges together.

2. A device as claimed in claim 1, wherein said grating film is one two-dimensional grating film sheet.

3. A device as claimed in claim 1, wherein said grating film is two superimposed one-dimensional grating film sheets.

4. The device of claim 1, wherein said grooves are disposed on said grating film with a density in the range of about 50 to about 1200 lines/mm.

5. A device of claim 4, wherein said density is in the range of about 150 to about 600 lines/mm.

6. The device of claim 1, wherein said selected angle is approximately 90°.

7. The device of claim 1, wherein said grating film is mounted on said substrate by adhesive.

8. The device of claim 7, wherein said adhesive is an epoxy adhesive.

9. The device of claim 7, wherein said adhesive is transparent and stable.

10. The device of claim 1, wherein said substrate consist of material selected from the group consisting of silica glass, organic glass and transparent plastic.

11. The device of claim 1, wherein said grating film is comprised of material from the group consisting of gelatine and transparent plastic.

12. A grating-film rainbow -producing device for use with a non-monochromatic light source comprising:
    - first and second transparent substrates disposed in registry;
    - a two-dimensional grating film disposed between and in registry with said substrates, said grating film having a plurality of sets of equally spaced parallel grooves with the grooves of each set intersecting with respective grooves in the other sets at a selected angle to form a plurality of light-passing ports; and
    - means disposed around the periphery of said substrates for holding said substrates together with said grating film held therebetween.

13. A device as claimed in claim 12, wherein said grating film is one two-dimensional grating sheet.

14. A device as claimed in claim 12, wherein said grating film is two superimposed one-dimensional grating film sheets.

15. A device as claimed in claim 12, wherein said selected angle is approximately 90°.

16. A grating-film rainbow-producing device for use with a non-monochromatic light source comprising:

at least one two-dimensional grating-film having a plurality of sets of equally spaced parallel grooves with the grooves of each set intersecting with respective grooves in the other sets at a selected angle to form a plurality of light-passing ports;

two transparent-substrates with said grating-film disposed between said substrates in registry therewith; and adhesive disposed at the peripheral edges of said substrates for holding said peripheral edges together.

17. The device of claim 16, wherein said grooves are disposed on said grating film with a density in the range of about 50 to about 1200 lines/mm.

18. A device of claim 17, wherein said density is in the range of about 150 to about 600 lines/mm.

19. The device of claim 16, wherein said selected angle is approximately 90°.

20. A grating-film rainbow-producing device for use with a non-monochromatic light source comprising:

at least two one-dimensional grating-films each having one set of equally spaced parallel grooves with the grooves of each set intersecting with respective grooves in the other sets at a selected angle to form a plurality of light-passing ports;

two transparent substrates with said grating-film disposed between said substrates in registry therewith; and adhesive disposed at the peripheral edges of said substrates for holding said peripheral edges together.

21. The device of claim 20, wherein said grooves are disposed on said grating film with a density in the range of about 50 to about 1200 lines/mm.

22. A device of claim 21, wherein said density is in the range of about 150 to about 600 lines/mm.

23. The device of claim 20, wherein said selected angle is approximately 90°.

24. A grating-film rainbow-producing device for use with a non-monochromatic light source comprising:

first and second transparent substrates disposed in registry;

at least two one-dimensional grating films disposed between and in registry with said substrates, said grating film having one set of equally spaced parallel grooves with the groove of each set intersecting with respective grooves in the other sets at a selected angle to form a plurality of light-passing ports; and means disposed around the periphery of said substrates together for holding said substrates with said grating film held therebetween.

25. A device as claimed in claim 24, wherein said selected angle is approximately 90°.

26. A grating-film rainbow-producing device for use with a non-monochromatic light source comprising:

a two-dimensional grating-film having a plurality of sets of equally spaced parallel grooves with the grooves of each set intersecting with respective grooves in the other sets at a selected angle to form a plurality of light-passing ports;

two transparent substrates with said grating-film disposed between said substrates in registry therewith; and means for mechanically holding the peripheral edges of said substrates together.

27. A grating-film rainbow-producing device for the with a non-monochromatic light source comprising:

at least two one-dimensional grating films each having one set of equally spaced parallel grooves with the grooves of each set intersecting with respective grooves in the other sets at a selected angle to form a plurality of light-passing ports;

two transparent substrates with said grating-film disposed between said substrates in registry therewith; and mechanical means for holding the peripheral edges of said substrates together.

* * * * *